(12) United States Patent
Kurahashi

(10) Patent No.: US 9,188,437 B2
(45) Date of Patent: Nov. 17, 2015

(54) METHOD OF MEASUREMENT AND APPARATUS FOR MEASUREMENT OF TOOL DIMENSIONS

(75) Inventor: Yasuhiro Kurahashi, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 287 days.

(21) Appl. No.: 13/881,605

(22) PCT Filed: Oct. 27, 2011

(86) PCT No.: PCT/JP2011/074846
§ 371 (c)(1),
(2), (4) Date: Apr. 25, 2013

(87) PCT Pub. No.: WO2012/057279
PCT Pub. Date: May 3, 2012

(65) Prior Publication Data
US 2013/0222580 A1 Aug. 29, 2013

(30) Foreign Application Priority Data
Oct. 27, 2010 (JP) .................................. 2010-241379

(51) Int. Cl.
*G01C 11/00* (2006.01)
*B23Q 17/24* (2006.01)
(Continued)

(52) U.S. Cl.
CPC ............ *G01C 11/00* (2013.01); *B23Q 17/2409* (2013.01); *B23Q 17/2452* (2013.01); *G01B 11/2433* (2013.01); *G06F 3/041* (2013.01); *G06F 3/0481* (2013.01)

(58) Field of Classification Search
CPC ... G01N 21/88; G01N 21/8803; G01N 21/95; G06F 3/0488; G01B 11/022; G01B 11/24
See application file for complete search history.

(56) References Cited

U.S. PATENT DOCUMENTS 6,640,423 B1 * 11/2003 Johnson et al. .................. 29/740
2002/0170192 A1 * 11/2002 Steffey et al. ................... 33/503
(Continued)

FOREIGN PATENT DOCUMENTS

| DE | 10 2004 055 602 | 10/2005 |
|---|---|---|
| DE | 20 2008 011 614 | 12/2008 |
| JP | 62-269282 | 11/1987 |
| JP | 2-41856 | 2/1990 |

(Continued)

OTHER PUBLICATIONS

International Search Report mailed Jan. 24, 2012, directed to International Application No. PCT/JP2011/074846; 2 pages.
(Continued)

*Primary Examiner* — Victor Kostak
(74) *Attorney, Agent, or Firm* — Morrison & Foerster LLP

(57) ABSTRACT

In the machine tool (10) pertaining to the present invention, the contour lines (51) of a tool (20) are displayed on a display screen (S). When an operator measuring the dimensions traces a contour line (51) on the display screen (S) of a touch panel (45) with a finger, it is possible to automatically identify, on the display screen (S), the site to be measured (i.e., the contour line (51)) on the tool (20). In this way, an operator can measure the dimensions of the tool (20) in an extremely simple manner. Additionally, it is possible to automatically measure the tool diameter or the blade position of the tool (20) as the operator designates a specific position on the contour line (51) of the tool (20). Thus, with such a method for measuring the dimensions of the tool (20), it is possible to easily identify an unexpected site to be measured on a tool having complex contour lines, such as a multi-stage tool.

6 Claims, 16 Drawing Sheets

(51) Int. Cl.
*G01B 11/24* (2006.01)
*G06F 3/041* (2006.01)
*G06F 3/0481* (2013.01)

(56) References Cited

U.S. PATENT DOCUMENTS

| | | | |
|---|---|---|---|
| 2004/0215410 A1* | 10/2004 | Siegers et al. | 702/84 |
| 2005/0281453 A1* | 12/2005 | Boyer | 382/141 |
| 2007/0097381 A1* | 5/2007 | Tobiason et al. | 356/604 |
| 2009/0248007 A1* | 10/2009 | Falkenstein et al. | 606/33 |

FOREIGN PATENT DOCUMENTS

| | | |
|---|---|---|
| JP | 7-129312 | 5/1995 |
| JP | 7-151512 | 6/1995 |
| JP | 7-230352 | 8/1995 |
| JP | 9-6525 | 1/1997 |
| JP | 2010-19559 | 1/2010 |
| WO | WO-2008/105530 | 9/2008 |

OTHER PUBLICATIONS

Search Report dated Feb. 27, 2014, directed to EP Application No. 11836412.4; 5 pages.

* cited by examiner

METHOD OF MEASUREMENT AND APPARATUS FOR MEASUREMENT OF TOOL DIMENSIONS

REFERENCE TO RELATED APPLICATIONS

This application is the national stage application under 35 USC 371 of International Application No. PCT/JP2011/074846, filed Oct. 27, 2011, which claims the priority of Japanese Patent Application No. 2010-241379, filed Oct. 27, 2010, the entire contents of which are incorporated herein by reference.

FIELD OF THE INVENTION

The present invention relates to a method and apparatus for measuring tool dimensions such as a cutting edge position, length and diameter of a tool, shape of a cutting edge, run-out of the tool, etc. of a tool which is used in a for example CNC (computer numerical control) machine tool.

BACKGROUND OF THE INVENTION

For example, in a machining center or other NC machine tool, at the time of working a workpiece, a drill bit or end mill or other tool which is attached to a spindle rotates while contacting the workpiece. In improving the precision of the positional control of such a tool, the position of the tool with respect to the spindle, the heat deformation of a rotating spindle, etc. must be considered. Therefore, in actuality, it is important to predict in advance the dimensions of the tool which is attached to the spindle.

PLT 1: Japanese Patent Publication No. 7-151512A

SUMMARY OF THE INVENTION

Technical Problem

In the past, a method of capturing an image of a tool which is attached to the spindle to measure the dimensions of the tool has been proposed. In this measurement method, the contour of the tool which is specified on the image is used as the basis to automatically measure the dimensions of the tool. However, this automatic measurement of dimensions is performed based on, for example, dimensions of tools which are registered in advance. Therefore, when a tool has unenvisioned dimensions, it is difficult to specify the measurement portion of the tool.

The present invention was made in consideration of this situation and has as its object the provision of a method of measurement and apparatus for measurement of tool dimensions which can simply specify a measurement portion even for an unenvisioned tool.

Solution to Problem

To achieve the above object, according to the present invention, there is provided a method of measurement of tool dimensions which uses an image capture device which moves relative to a tool so as to capture an image of the tool and which uses the obtained image data to measure the dimensions of the tool, the method of measurement of tool dimensions comprising the steps of displaying an image including a contour of the tool which was captured by the image capture device on a display screen of the display device, detecting a teaching point designated by touching on the image by a contact detection device, and using the detected teaching point as the basis to specify a measurement portion, measurement direction, or movement direction of the shape of the tool.

The method of measurement of tool dimensions, in specification of the measurement portion, measurement direction, or movement direction, uses a plurality of teaching points of different positions which are consecutively detected as the basis to calculate a path of the teaching points and uses the calculated path as the basis to calculate at least one of a contour of the tool, a movement path of the tool, and a center axial line of the tool.

Further, the method of measurement of tool dimensions, in specification of the measurement portion, measurement direction, or movement direction, uses a plurality of the teaching points of different positions which are consecutively detected as the basis to calculate a path of the teaching points and uses the calculated path as the basis to output movement signals for making the contour of the tool outside of the field of view of the image move to the inside of the field of view of the image.

According to the present invention, there is provided an apparatus for measurement of tool dimensions which uses image data which was obtained by capturing an image of the tool so as to measure the dimensions of the tool, the apparatus for measurement of tool dimensions provided with an image capture device which captures an image including a contour of the tool, a display device which has a display screen which displays the image, a contact detection device which detects a teaching point designated by touching on the image, and a processing device which uses the detected teaching point as the basis to specify a measurement portion, measurement direction, or movement direction of the shape of the tool.

In the apparatus for measurement of tool dimensions, the processing device, in specification of the measurement portion, measurement direction, or movement direction, uses a plurality of the teaching points of different positions which are consecutively detected as the basis to calculate a path of the teaching points and uses the calculated path as the basis to calculate at least one of a contour of the tool, a movement path of the tool, and a center axial line of the tool.

Further, in the apparatus for measurement of tool dimensions, the processing device, in specification of the measurement portion, measurement direction, or movement direction, uses a plurality of the teaching points of different positions which are consecutively detected as the basis to calculate a path of the teaching points and uses the calculated path as the basis to output movement signals for making the contour of the tool outside of the field of view of the image move to the inside of the field of view of the image.

According to the present invention, it is possible to provide a method of measurement and apparatus for measurement of tool dimensions which can simply specify a measurement portion even for an unenvisioned tool.

DETAILED DESCRIPTION OF THE INVENTION

Figure 1:
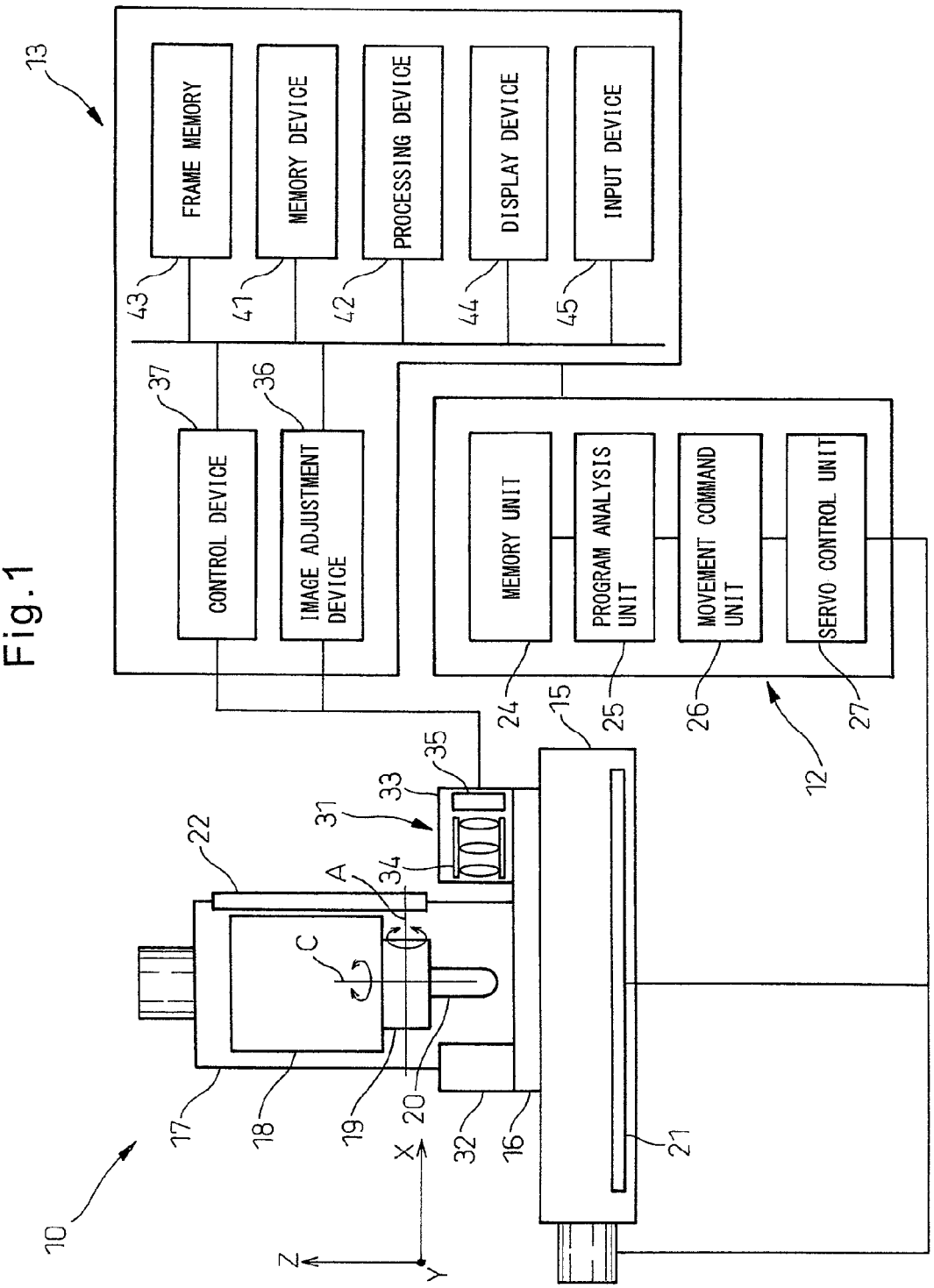
FIG. 1 is a view which schematically shows the configuration of a machine tool which is provided with an apparatus for measurement of tool dimensions according to one embodiment of the present invention.

Below, embodiments of the present invention will be explained with reference to the drawings. FIG. 1 is a view which schematically shows the configuration of a machine tool 10 which is provided with the apparatus for measurement of tool dimensions according to one embodiment of the present invention. This machine tool 10 is provided with, not only mechanical parts which perform work on a workpiece (not shown), but also an NC device 12 which controls operation of the machine tool 10 and a dimension measurement apparatus 13 which is connected to the machine tool 10 and the NC device 12 and which measures the dimensions of a tool of a machine tool 10. For the machine tool 10, for example, a five-axis vertical machining center is used. In the present embodiment, the dimension measurement apparatus 13 is shown separate from the NC device 12, but the dimension measurement apparatus 13 may also for example be assembled inside of the NC device 12.

First, the configuration of the machine tool 10 will be explained. The machine tool 10 is set with an XYZ perpendicular three-axis reference coordinate system. The machine tool 10 is provided with a bed 15 which extends along a horizontal surface, that is, an XY plane, a table base 16 which is arranged on the bed 15, and a column 17 which rises from the bed 15 at the rear of the table base 16 in the vertical direction parallel to the Z-axis. A workpiece (not shown) is fastened on the table base 16. A spindle head 18 is supported on the column 17. At the bottom end of the spindle head 18, a tool 20 is attached facing downward via the spindle 19 in a detachable manner. The tool 20 is driven to rotate by a spindle motor (not shown) which is assembled inside the spindle 18. Here, for the tool 20, for example, a ball end mill is used.

In addition, the spindle head 18 is attached through an A-axis rotary feed mechanism to a spindle stock (not shown) to be able to turn about an axial line parallel to the X-axis. At the same time, the spindle head 18 is attached through a C-axis rotary feed mechanism to the spindle stock to be able to turn about an axial line parallel to the Z-axis. The rotary feed mechanism is, for example, comprised of a direct drive motor or servo motor. In the spindle head 18, rotational angle detectors (not shown) are assembled for detecting the rotational angles about the A-axis and C-axial directions. The rotational angles which are read by these rotational angle detectors are output, that is, fed back, to the NC device 12.

The table base 16 is supported on the bed 15 to be able to move in the horizontal direction (X-axial direction) through a linear feed mechanism. On the other hand, the spindle head 18 is supported at the column 17 to be able to move in the vertical direction (Z-axial direction) and horizontal direction (Y-axial direction) through linear feed mechanisms. The linear feed mechanisms are, for example, provided with ball screws and servo motors which drive rotation of the ball screws. Note that, instead of movement of the spindle head 18 in the Y-axial direction, the table base 16 may move in the Y-axial direction. Further, instead of a configuration where the spindle head 18 has an A-axis and C-axis, a configuration where the table base 16 has an A-axis and C-axis is also possible.

The bed 15 has built into it an X-axial position detector 21 which reads the relative position between the bed 15 and the table base 16 along the X-axis. The column 17 has built into it a Y-axial position detector (not shown) and a Z-axial position detector 22 which read the relative positions between the column 17 and the spindle head 18 along the Y-axis and the Z-axis. For these position detectors, for example, digital scales may be used. The relative positions which are read by these position detectors are specified by the coordinate values of the reference coordinate system. The read coordinate values are output, that is, are fed back, to the NC device 12.

The above-mentioned rotary feed mechanism and linear feed mechanism are used to realize relative movement between the table base 16 and the spindle 19, that is, the tool 20. The relative movement is realized based on later explained drive signals which are supplied from the NC device 12. During the relative movement, the rotating tool 20 contacts the workpiece at a predetermined working point. In this way, the workpiece is worked to the desired shape.

Next, the configuration of the NC device 12 will be explained. The NC device 12 is provided with a memory unit 24 which stores an NC program, a program analysis unit 25 which analyzes the NC program which is stored in the memory unit 24, a movement command unit 26 which generates movement commands in accordance with the NC program which was analyzed by the program analysis unit 25, and a servo control unit 27 which outputs drive signals to the servo motors of the machine tool 10 in accordance with movement commands which are output from the movement command unit 26. The movement commands include, for example, indexing data of the working point of the workpiece and coordinate value data which shows the position of the spindle head 18 corresponding to a working point after indexing.

Next, the configuration of the dimension measurement apparatus 13 will be explained. The dimension measurement apparatus 13 is provided with a dimension measurement unit 31 which is arranged on the table base 16. The dimension measurement unit 31 is provided with a light source 32 and an image capture device 33 which faces the light source 32. For the light source 32, for example, a high luminance LED which outputs parallel light toward the image capture device 33 is used. The image capture device 33 is provided with a lens unit 34 and CCD (charge coupled device) image sensor 35. The CCD image sensor 35 is, for example, a 2D image sensor.

The dimension measurement apparatus 13 is provided with an image adjustment device 36 which receives image data of a captured image from the image capture device 33 and a control device 37 which controls the operation of a light source device 32 and image capture device 33. The above-mentioned CCD image sensor 35 outputs an analog image signal corresponding to an image which is formed on the light receiving surface at, for example, a frame rate of 30 to 60 frames per second. The analog image signal is converted to digital image data by an A/D converter which is built into the image capture device 33 and is output to the image adjustment device 36.

The image adjustment device 36 performs shading correction, noise reduction, white balance adjustment, contour correction, contrast adjustment, and other image adjustment processing and binarizes the digital image data. The image adjustment device 36 stores the image data after image adjustment in the later explained frame memory. On the other hand, the control device 37 outputs a drive signal which controls movement or zoom of the image capture device 33 to the image capture device 33. Note that, in the field of view of the image capture device 33, an xy perpendicular 2-axis field-of-view coordinate system is set corresponding to the YZ plane of the above-mentioned reference coordinate system. The coordinate values of this field-of-view coordinate system are linked with the coordinate values of the reference coordinate system in each field of view of the positions after movement of the image capture device 33 in the YZ plane.

The dimension measurement apparatus 13 is provided with a memory device 41 which stores the dimension measurement program and tool data, a processing device 42 which performs various processing based on the dimension measurement program, and a frame memory 43 which stores the image data for each frame. In the processing, the dimension measurement program may be read out temporarily to a memory (not shown). Details of the dimension measurement program and tool data will be explained later. Note that, the dimension measurement program may, for example, be read from a FD (floppy disk) or CD-ROM or other portable memory medium to the memory device 41 or may be downloaded from a LAN or Internet or other such computer network to the memory device 41.

The dimension measurement apparatus 13 is provided with a display device 44 which has a display screen which displays an image which is specified by the above-mentioned image data and a contact detection device which is arranged superposed on the display screen of the display device 44, that is, a touch panel 45. The display device 44, for example, may be an LCD (liquid crystal display) panel or other flat display panel. For the touch panel 45, for example, an electrostatic capacity type touch panel may be employed. If the surface of the touch panel 45, for example, is taught contact by a finger, the touch panel 45 can output a coordinate value signal relating to the coordinate values of a teaching point, that is, a contact position, to the processing device 42. The processing device 42 links the output coordinate values with the above-mentioned field-of-view coordinate system which is displayed on the display screen. Note that, the contact detection device does not necessarily have to be arranged on the display screen. For example, it may be a device which can detect teaching of contact to the display screen.

Here, the touch panel 45 can detect operation by a gesture. For example, the touch panel 45 can detect a plurality of contact positions of consecutive different positions based on movement of the finger on the touch panel 45. The processing device 42 handles various processing for detection of the plurality of contact positions. For example, relative movement of the tool 20 and image capture device 33 is linked with a so-called flick operation where a finger is made to move quickly on the touch panel 45 over a predetermined movement distance. Further, relative movement of the tool 20 and image capture device 33 is linked with a so-called drag operation where a finger is made to move on the touch panel 45 while in contact with it. Note that, in the dimension measurement apparatus 13, various measurement modes may be set. The processing device 42 turns the flick operation and drag operation on and off in accordance with the measurement mode.

Next, the method of measurement of the dimensions of the tool 20 according to a first embodiment of the present invention will be explained. In performing the processing, the processing device 42 of the dimension measurement apparatus 13 reads out the corresponding dimension measurement program from the memory device 41 to, for example, the memory. In this way, the processing device 42 performs various processing based on the dimension measurement program. First, the processing device 42 outputs a start signal to the NC device 12. In response to receipt of the start signal, the NC device 12 outputs a drive command toward the machine tool 10. As a result, in the machine tool 10, the spindle 19 is positioned on the XY plane at a predetermined position between the light source 32 and the image capture device 33. The tool 20 is driven to rotate about its center of rotation. The spindle head 18, that is, the tool 20, in made to descend in parallel to the Z-axis.

At the same time, the processing device 42 makes the light source device 32 and image capture device 33 start operating. The control device 37 outputs a drive signal for driving the image capture device 33. In this way, the image capture device 33 starts capturing an image. The image capture device 33 generates an analog image signal for each frame captured. The image data which is generated from this image signal is stored through the image adjustment device 36 in the frame memory 43 for each frame. If, based on the descent of the spindle head 18, part of the contour of the tool 20 enters into the field of view of the image of the image capture device 33, the descent of the spindle head 18 along the Z-axis is stopped. In this way, the tool 20 is positioned at the measurement position. The contour of the tool 20 is specified inside the field of view of the image of the image capture device 33.

At the light receiving surface of the CCD image sensor 35, an image of a projection of a shadow of the tool 20 is formed by parallel light which is emitted from the light source 32. The image data is comprised of a large number of pixels which specify an image inside of the field of view. As explained above, in the image data, two brightness values are specified for each pixel, so in the field of view specified by the image data, the dark pixels are specified as projected parts of the shadow of the tool 20, while the bright pixels are specified as parts receiving the parallel light. In this way, the contour of the tool 20 is specified.

Figure 2:
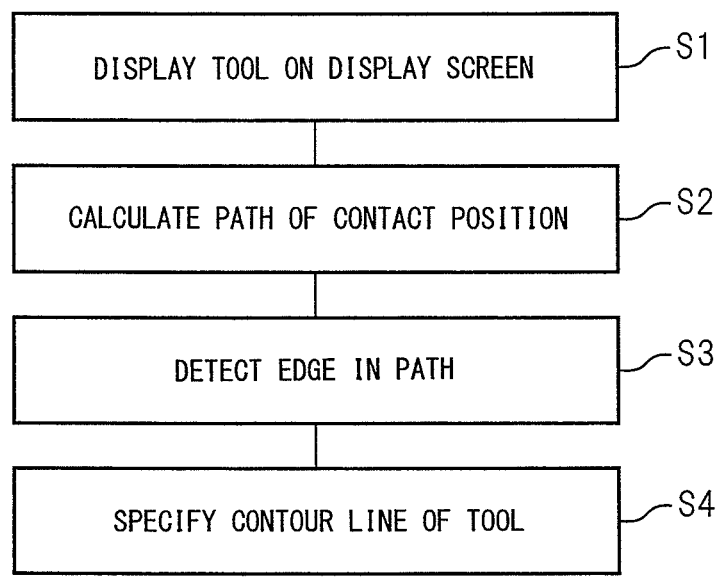
FIG. 2 is a flow chart which shows the flow of processing of a method of measurement of tool dimensions according to a first embodiment of the present invention.
Figure 3:
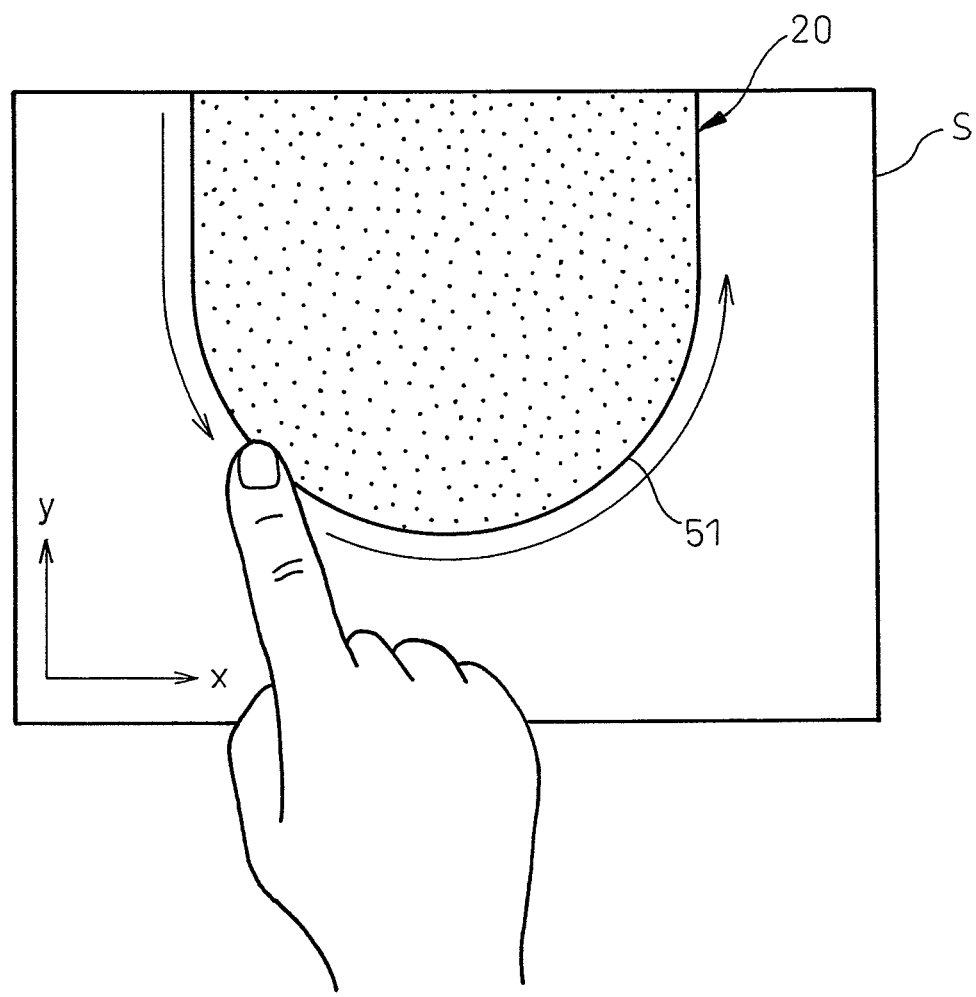
FIG. 3 is a view which shows a step of using an image which is displayed on a display screen as the basis to specify the shape of a tool.

FIG. 2 is a flow chart which shows the flow of processing of the method of measurement of the dimensions of the tool 20 according to a first embodiment of the present invention. In this first embodiment, the flick operation and drag operation are turned off. At step S1, the processing device 42 displays an image including the contour of the tool 20 at the measurement position on the display screen of the display device 44. In display, image data which specifies an image which includes the contour of the tool 20 at the measurement position is read from the frame memory 43. As shown in FIG. 3, the display screen S displays a tool 20. At this time, if following the contour line 51 of the tool 20 on the display screen S by a finger, the touch panel 45 detects the contact positions of the finger and outputs coordinate value signals which correspond to the contact positions to the processing device 42. Receiving the coordinate value signals, at step S2, the processing device 42 calculates the path of the contact positions corresponding to the coordinate values. The path is, for example, formed by a width of the contact region of a finger.

Next, at step S3, the processing device 42 detects the edge of the contour line 51 at the region on the image data which corresponds to the region of the path. As explained above, the pixels of the image data are shown by two brightness values, so the edge is specified by dark pixels which adjoin bright pixels among the dark pixels which correspond to pixels of the image of the tool 20 in the field of view of the image. In this way, at step S4, the processing device 42 specifies a measurement position of the shape of the tool 20, that is, a contour line 51, based on the extraction of a continuous plurality of dark pixels adjoining bright pixels. The contour line 51 is, for example, specified by a recurrence curve. Note that, for example, if the finger departs from the contour line 51 and the edge is partially broken in the path, it is sufficient to detect the edge of the contour line 51 in the region near the path. The specified contour line 51 is specified in the image data by the coordinate values of the field-of-view coordinate system. In this way, for example, the operator who is measuring the dimensions can teach the dimension measurement apparatus 13 the contour line 51.

Figure 4:
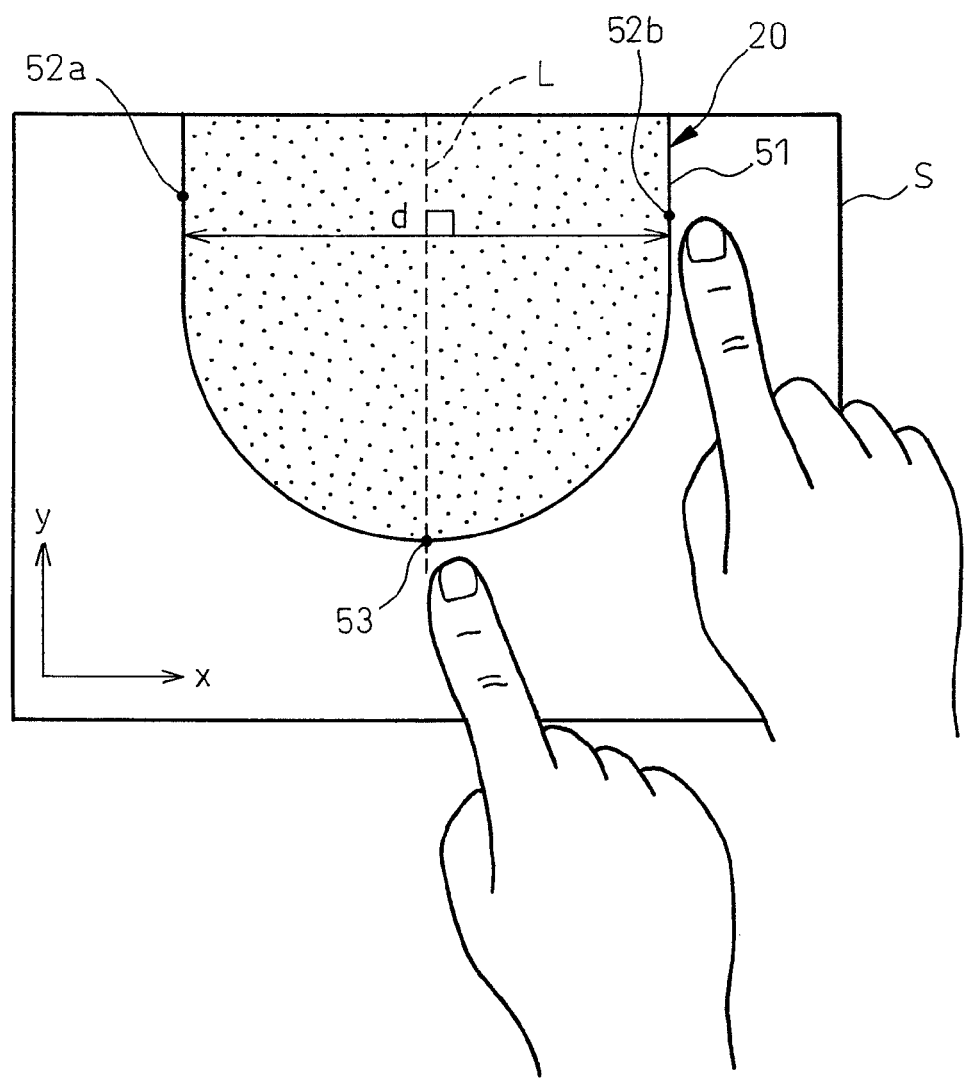
FIG. 4 is a view which shows a step of using an image which is displayed on a display screen as the basis to specify the shape of a tool.

At this time, for example, the tool size of the tool 20 may be measured. As shown in FIG. 4, for example, if the operator touches with his finger any two points on the parallel components of the contour line 51 which extend in parallel with each other, the processing device 42 uses the coordinate values which are output from the touch panel 45 as the basis to designate the points as the measurement points 52a, 52b. The processing device 42 subtracts from the coordinate values of the one measurement point 52a on the x-axis the coordinate values of the other measurement point 52b so as to measure the tool size "d" of the tool 20. In measurement, the coordinate values of the field-of-view coordinate system may be converted to coordinate values of the reference coordinate system. Further, the coordinate values of an intermediate position of the coordinate values on the x-axis of the parallel components of the contour line 51 may be used as the basis to calculate the center of rotation of the tool 20, that is, the center axial line L. Here, the center axial line L may be defined in parallel with the y-axis.

Further, for example, the cutting edge position of the tool 20 may be measured. For example, when the operator moves his or her finger to any point near the bottom end of a semicircular contour line 51, the processing device 42 uses the coordinate values which are output from the touch panel 45 as the basis to designate the measurement point 53. Here, the processing device 42 specifies the point on the contour line 51 where the y-axis coordinate value becomes the smallest as the measurement point 53. In other words, the intersection of the center axial line L of the tool 20 and the contour line 51 may be specified as the cutting edge position. This cutting edge position may be used as the basis to calculate the tool length of the tool 20. In this way, the coordinate values of the contour line 51 or tool size, cutting edge position, etc. which are measured are stored in the frame memory 43 linked with the image data.

In the above way, according to the machine tool 10 according to the first embodiment, the display screen S displays the contour line 51 of the tool 20. If the operator who is measuring the dimensions follows the contour line 51 on the touch panel 45 with his or her finger, the measurement portion of the tool 20, that is, the contour line 51, can be automatically specified on the display screen S. In addition, the operator can extremely simply measure the dimensions of the tool 20. The operator can, for example, designate a specific position on the contour line 51 of the tool 20 to enable the tool size or cutting edge position of the tool 20 to be automatically measured. Therefore, according to the method of measurement of dimensions of a tool 20, it is possible, for example, for the measurement portion of an unenvisioned tool which has a complicated contour line such as a multistep tool to be simply specified.

Next, a method of measurement of the dimensions of a tool 20 according to a second embodiment of the present invention will be explained. In the same way as above, the processing device 42 uses a dimension measurement program as the basis to output a start signal. The machine tool 10, light source 32, and image capture device 33 start operating. In the machine tool 10, the spindle 19 is positioned on the XY plane at a predetermined position between the light source 32 and the image capture device 33. At the same time, the spindle 19 is, for example, positioned at a position of any rotational angle in the A-axial direction. In this way, the center axial line of the tool 20 intersects the Y-axis and the Z-axis on the YZ perpendicular two-axis planar coordinate system of the reference coordinate system. In this way, the tool 20 takes a slanted posture. Here, the rotational angle is, for example, set to an angle of the center axial line of the tool 20 rotated from the state parallel to the Z-axis toward the horizontal surface by 45 degrees in the A-axial direction.

The tool 20 is made to move by linear movement in the Y-axial direction and linear movement in the Z-axial direction along a 45 degree feed direction. The speed of linear movement in the Y-axial direction and speed of linear movement in the Z-axial direction are set equal. That is, in the settings of the machine tool 10, the rotational angle of the tool 20 in the A-axial direction and the angle of the feed direction of the tool 20 are set the same. Therefore, the movement path of the tool 20 is set to a direction which intersects the Y-axis and the Z-axis of the reference coordinate system which is set at the machine tool 10. If the tool 20 enters the field of view of the image capture device 33, image data is output for each frame capturing the tool 20 at different positions in movement in the set feed direction. Note that, the movement of the tool 20 is stopped at the point of time when the tool 20 moves in the field of view over a predetermined distance. The distance may be freely set.

Figure 5:
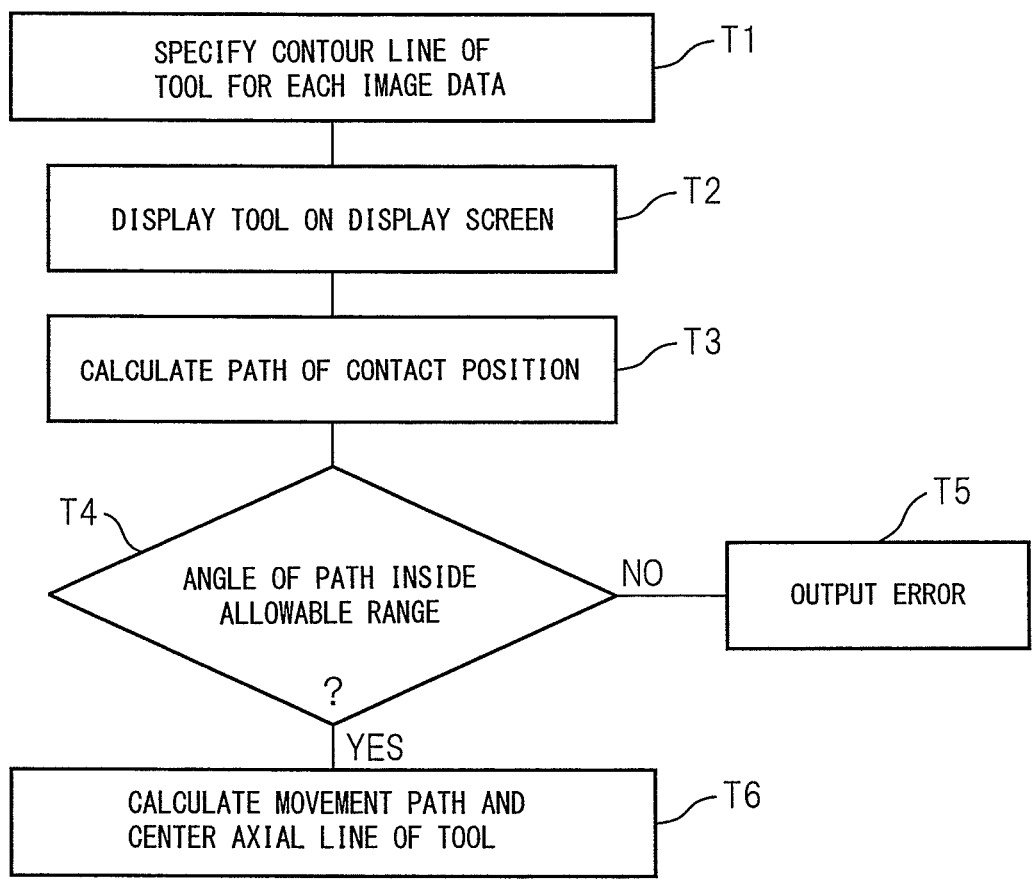
FIG. 5 is a flow chart which shows the flow of processing of a method of measurement of tool dimensions according to a second embodiment of the present invention.
Figure 6:
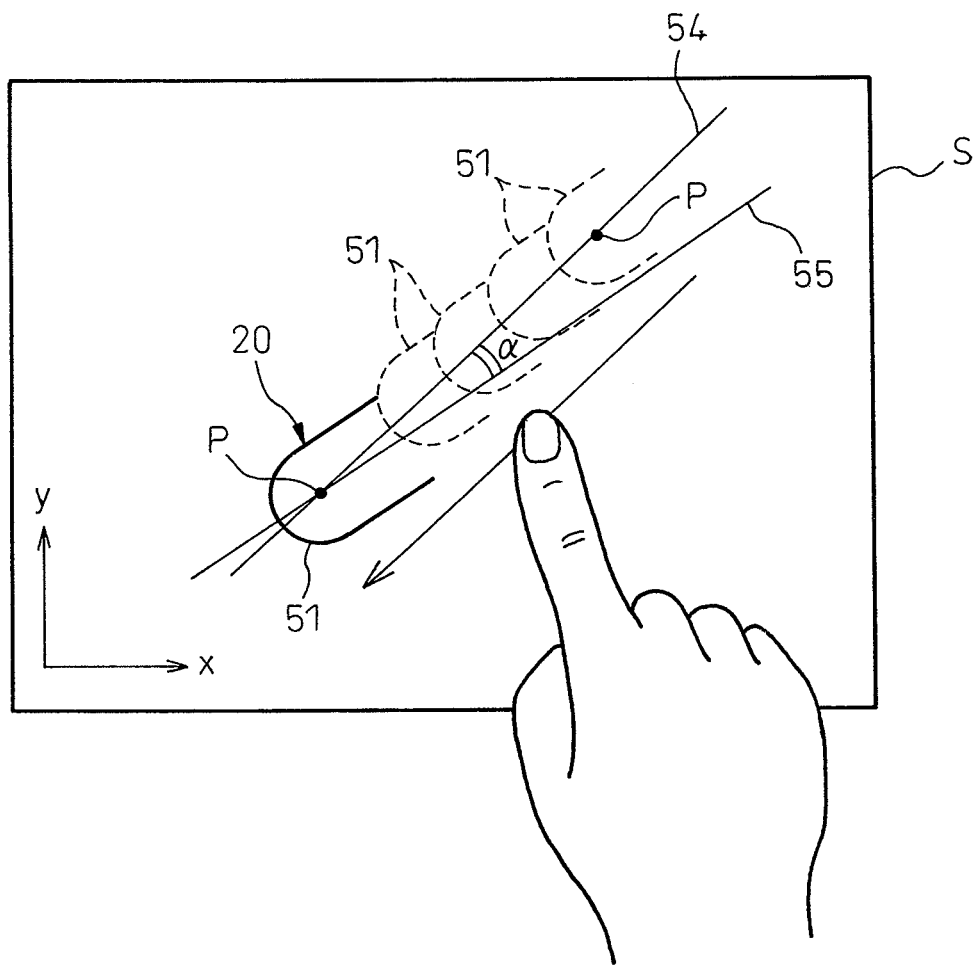
FIG. 6 is a view which shows a step of using an image which is displayed on a display screen as the basis to specify the shape of a tool.

FIG. 5 is a flow chart which shows the flow of processing of the method of measurement of dimensions of the tool 20 according to the second embodiment of the present invention. In this second embodiment, the flick operation and drag operation are turned off. At step T1, the processing device 42 specifies the contour line 51 for each image data showing the contour of the tool 20. In the same way as explained above, by detection of the edge, the contour line 51 may be specified by the coordinate values for each image data. As shown in FIG. 6, at step T2, the processing device 42 displays a plurality of contour lines 51 at different specified positions on the display screen S. At this time, if the finger roughly follows the feed direction of the tool 20, that is, the movement direction, on the display screen S, the touch panel 45 detects the contact positions of the finger and outputs coordinate value signals corresponding to the contact positions to the processing device 42. Receiving the coordinate value signals, at step T3, the processing device 42 calculates the path of the contact positions in accordance with the coordinate values.

The processing device 42 calculates the slant, that is, angle, of the path of the contact positions in the field-of-view coordinate system. Next, at step T4, the processing device 42 compares the angle of the path with the angle of the feed direction of the tool 20 which has been set (here, 45 degrees). Here, for the angle of the feed direction, a predetermined allowable range may be set which allows a predetermined offset from the set angle. If the angle of the path is not an angle in the allowable range, at step T5, the processing device 42, for example, displays "error" on the display screen S. On the other hand, if the angle of the path is an angle in the allowable range, at step T6, the processing device 42 calculates the movement path 54 and center axial line 55 of the tool 20. Note that, the movement path 54 is the path of the movement of the tool 20 which is sent by the linear feed mechanism in a predetermined feed direction. The center axial line 55 is the center axial line of the tool 20 which matches the center of rotation of the spindle 19.

Figure 7:
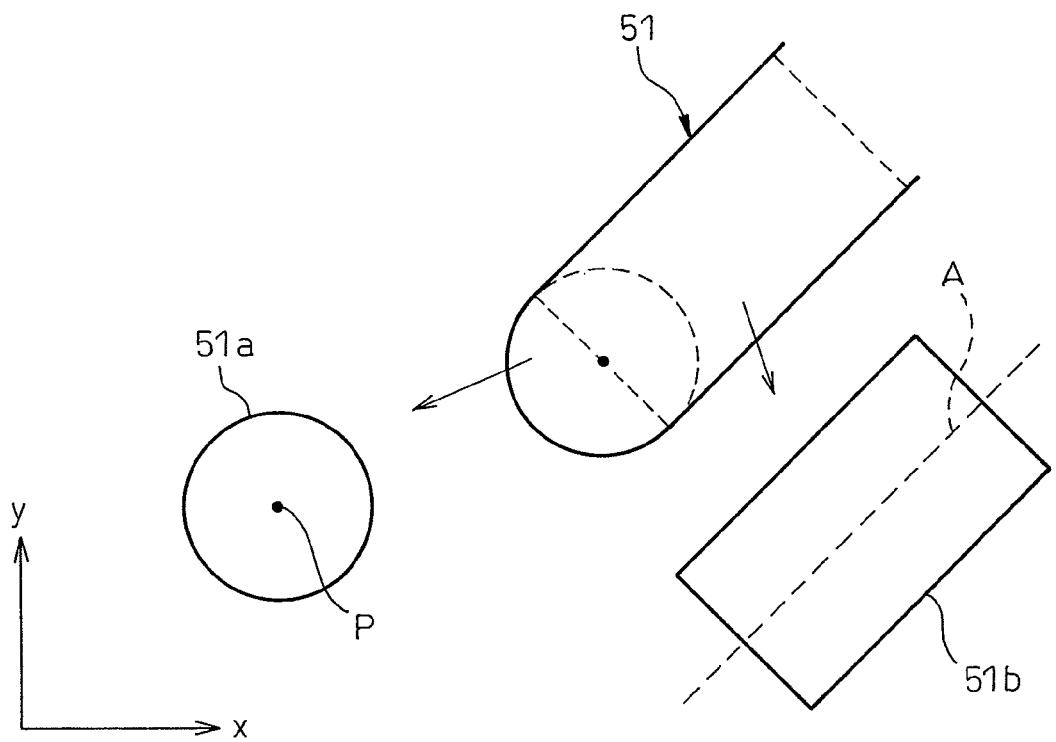
FIG. 7 is a view which shows a step of identifying the configuration of a contour line of a tool.

In calculation of the movement path 54 and the center axial line 55, the processing device 42 identifies the contour line 51 for each image data. The tool 20 is a ball end mill, so, as shown in FIG. 7, in the processing device 42, for example, the circle 51a which is prescribed at the front end of the tool 20 and the rectangular shape 51b which is connected to the rear end of the circle 51a are identified. In identification of the circle 51a, the semicircle of the front end of the tool 20 may be specified from the shape of the contour line 51. In specification of the rectangular shape 51b, parallel components may be specified from the contour line 51.

The processing device 42 specifies the center point P from the circle 51a. At the same time, the processing device 42 specifies the axial line A of the longitudinal direction from the rectangular shape 51b. The coordinate values in the field-of-view coordinate system at the pixels forming the circle 51a, center point P, rectangular shape 51b, and axial line A are specified. Here, the coordinate values which specify the rectangular shape 51b are used as the basis to convert the axial line A to a numerical formula. In this way, the image data with specified coordinate values is stored in the frame memory 43. The coordinate value data which shows the coordinate values of the field-of-view coordinate system of the circle 51a, center point P, rectangular shape 51b, and axial line A is stored in the frame memory 43 linked with the image data.

Next, the processing device 42 uses the trend in the positions of the plurality of center points P specified for each of the plurality of frames as the basis to calculate the movement path of the tool 20. The circle 51a specified for each frame is arranged based on the field-of-view coordinate system whereby the coordinate values (xn, yn) of the center points Pn are specified. The recurrence curve which passes through all of the specified center points P is calculated. In this way, the calculated recurrence curve corresponds to the movement path 54 of the tool 20 which is shown in FIG. 6. Similarly, the average of the plurality of axial lines A specified at the plurality of frames is used as the basis to calculate the center axial line 55 of the tool 20 which is shown in FIG. 6. Specifically, the average recurrence curve of the plurality of axial lines A is calculated. Tool data which specifies the calculated movement path 54 and center axial line 55 is stored in the memory device 41. In the tool data, the coordinate values may be specified converted from coordinate values of the field-of-view coordinate system to the reference coordinate system.

As clear from FIG. 6, in the example of the present embodiment, the movement path 54 and the center axial line 55 of the tool 20 54 do not match. The movement path 54 and the center axial line 55 intersect by, for example, the intersecting angle α. Here, assuming the angle of the movement path 54, that is, the angle of the feed direction, is 45 degrees as set, it will be understood that, for example, the position of the spindle 19 in rotational angle is off from the set 45 degrees. This offset ends up remarkably lowering the working precision of the workpiece. Therefore, the calculated intersecting angle α may be used for mechanical correction of the rotational angle in the A-axial direction of the machine tool 10 or may be used for correction of the coordinate values for control of the position of the spindle 19 of the NC device 12. In this way, in the machine tool 10, correction is performed so that the center axial line 54 and the movement path 55 match. Note that, the results of measurement of the dimensions show that when the movement path 54 and the center axial line 55 match, the position of the rotational angle of the spindle 19 is as set.

Figure 8:
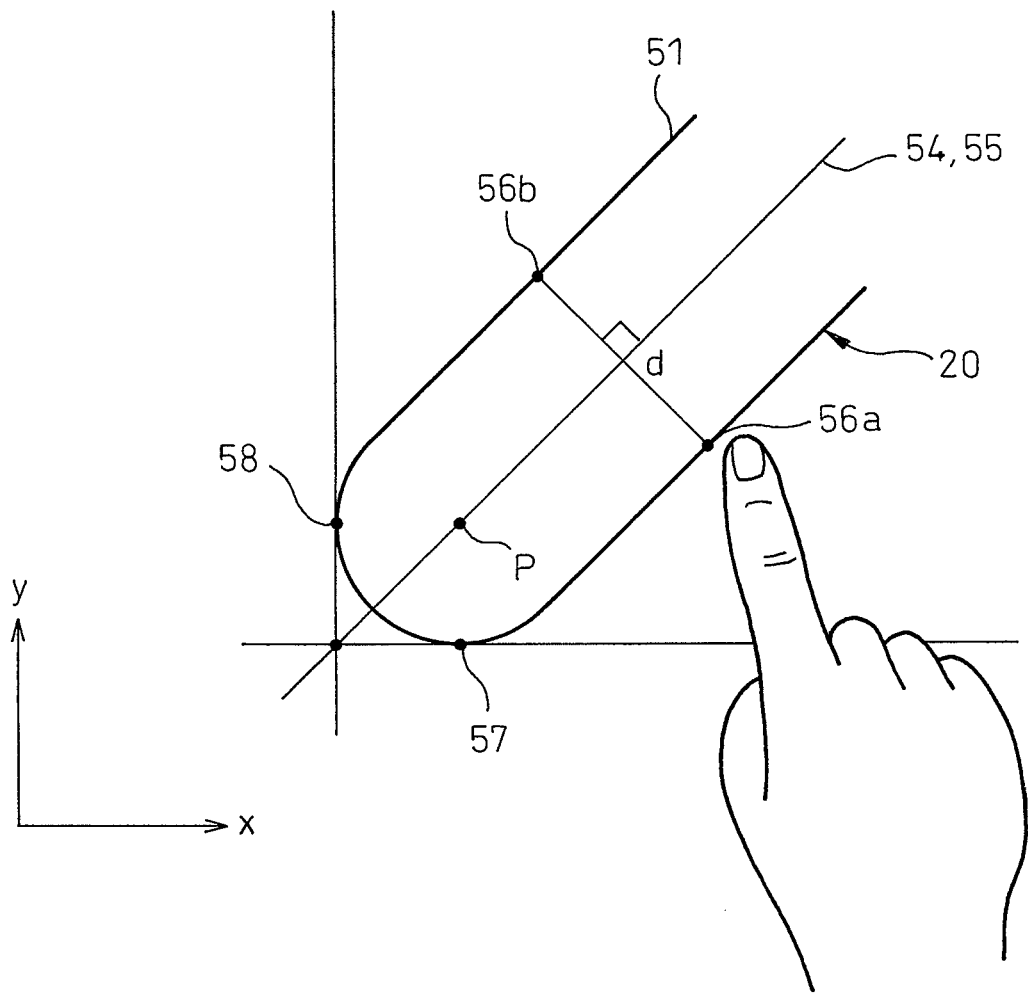
FIG. 8 is a view which shows a step of using an image which is displayed on a display screen as the basis to specify the shape of a tool.

In addition to the above such measurement, the dimension measurement apparatus 13 can measure the tool size or cutting edge position for a tool 20 with a slanted posture. For example, as shown in FIG. 8, the display screen S displays the contour line 51 of a tool 20 which is specified based on single image data. Here, the case where the movement path 54 matches the center axial line 55 is envisioned. When the operator, for example, touches with his finger any two points on the parallel components of a contour line 51 which extend in parallel with each other, the processing device 42 uses the coordinate values which are output from the touch panel 45 as the basis to designate the points as the measurement points 56a, 56b. The processing device 42 may use the designated measurement points 56a, 56b as the basis to measure the distance between the parallel components of the contour line 51, that is, the distance "d" on the imaginary line perpendicularly intersecting the movement path 54 and the center axial line 55. In this way, the measured distance "d" corresponds to the tool size of the tool 20.

Further, for example, the cutting edge position of the tool 20 may also be measured. For example, if the operator contacts any point near the bottom end of the semicircular contour line 51 by his or her finger, the processing device 42 uses the coordinate values which are output from the touch panel 45 as the basis to designate this point as the measurement point 57. Here, the processing device 42 specifies the point on the contour line 51 at which the y-axis coordinate value becomes the smallest as the measurement point 57. The tangent of the measurement point 57 is prescribed in parallel with the x-axis. This measurement point 57 may be specified as the cutting edge position. This cutting edge position is used as the basis to calculate the tool length of the tool 20. Similarly, the measurement point 58 may be specified as the point where the x-axis coordinate value becomes the smallest. The tangent of the measurement point 58 is prescribed in parallel with the y-axis. The coordinate values of the thus specified contour line 51 or tool size, cutting edge position, etc. are stored in the frame memory 43 linked with the image data.

In the above way, according to the machine tool 10 according to the second embodiment, the display screen S displays the contour line 51 of the tool 20. If the operator who is measuring the dimensions follows a predetermined movement path on the touch panel 45 by his or her finger, the measurement portion of the tool 20 on the display screen S, that is, the movement path 54 and center axial line 55 of the tool 20, can be automatically specified. In this way, the operator can measure the shape of the tool 20 extremely simply. In addition, the operator can, for example, designate a specific position of the contour line 51 of a tool 20 whereby the tool size and cutting edge position of the tool 20 are automatically measured. Therefore, according to the method of measurement of dimensions of a tool 20, it is possible, for example, for the measurement portion of an unenvisioned tool which has a complicated contour line such as a multistep tool to be simply specified.

Figure 9:
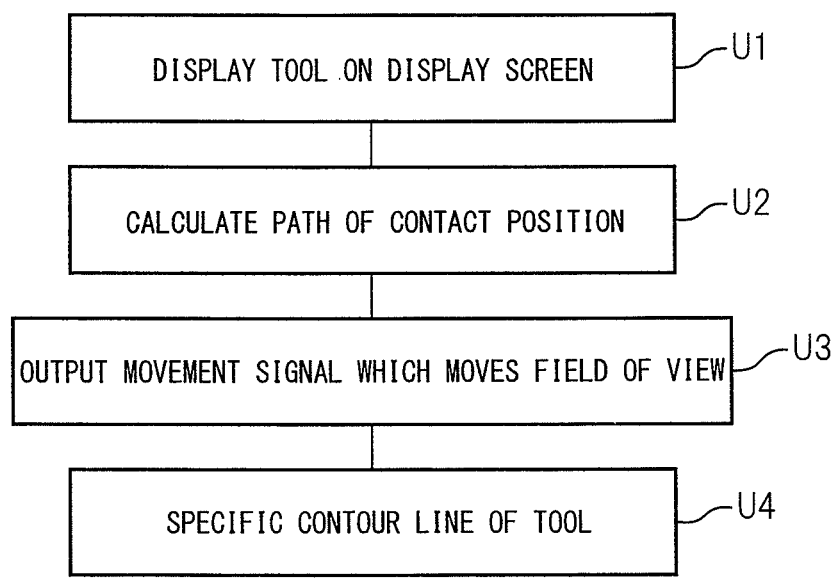
FIG. 9 is a flow chart which shows the flow of processing of a method of measurement of tool dimensions according to a third embodiment of the present invention.
Figure 10:
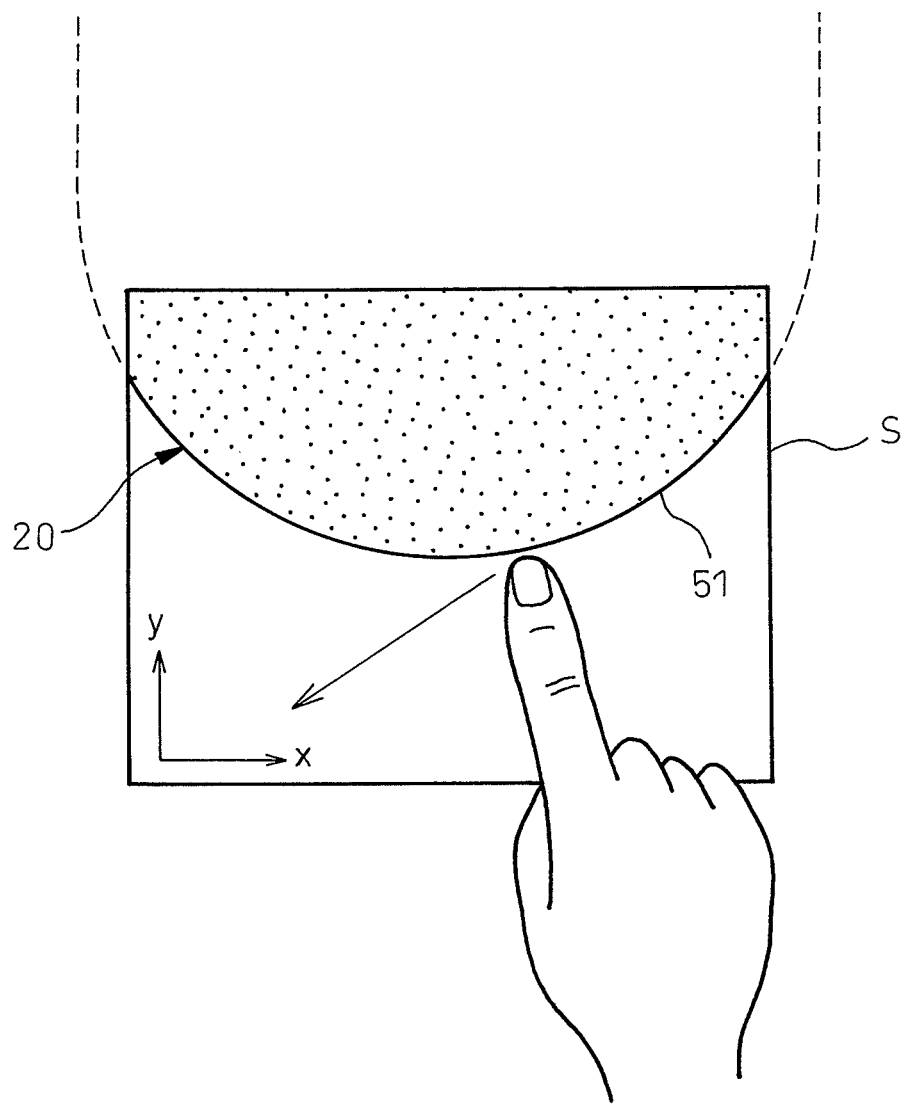
FIG. 10 is a view which shows a step of using an image which is displayed on a display screen as the basis to specify the shape of a tool.

Next, a method of measurement of the dimensions of a tool 20 according to a third embodiment of the present invention will be explained. In this third embodiment, the flick operation and the drag operation are turned on. FIG. 9 is a flow chart which shows the flow of processing of the method of measurement of dimensions of a tool 20 according to the third embodiment of the present invention. In the same way as the above-mentioned first embodiment, the tool 20 is positioned at the measurement position. At step U1, the display screen S displays the contour of the tool 20. At this time, as shown in FIG. 10, for example, if the tool 20 is larger in dimensions than the field of view of the image etc., the entire contour of the tool 20 sometimes will not fit in the display screen S. For example, the case where the tool size of the tool 20 is larger than the field of view of the image capture device 33, that is, the width of the display screen S is envisioned.

At this time, if the operator makes his or her finger move on the touch panel 45 by a flick operation or drag operation in the direction in which the tool 20 is desired to be moved, the touch panel 45 detects the contact positions of the finger at the consecutive different positions and outputs coordinate value signals corresponding to the contact positions to the processing device 42. Receiving the coordinate value signals, at step U2, the processing device 42 calculates the path of the contact positions corresponding to the coordinate values. In calculation, the movement direction of the contact positions of the finger is specified as the orientation of the path. Here, a ball end mill is used for the tool 20 and the display screen S displays the front end of the ball end mill, so the operator may, for example, use a drag operation to move the finger on the touch panel 45 toward the bottom left of the display screen S.

Figure 11:
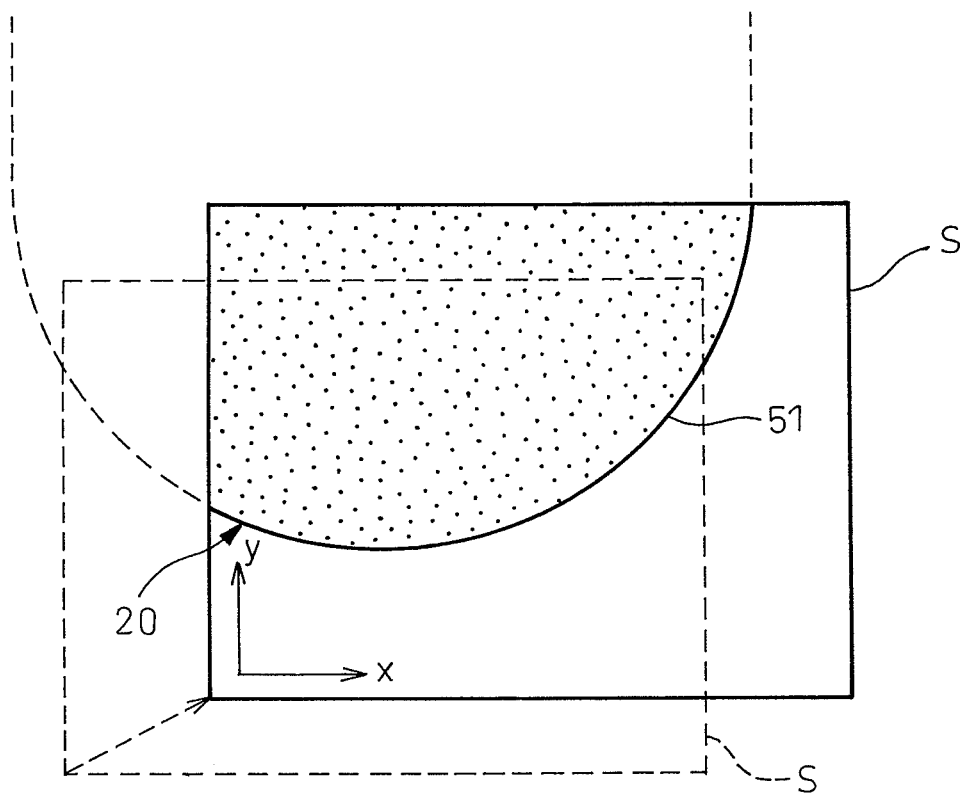
FIG. 11 is a view which shows a step of using an image which is displayed on a display screen as the basis to specify the shape of a tool.

Based on the calculated path, the processing device 42 makes the field of view of the image capture device 33 move. At step U3, the processing device 42 outputs movement signals making the tool 20 and the image capture device 33 relatively move to the NC device 12. Receiving the movement signals, the NC device 12 makes the tool 20 move in the YZ plane. In this way, as shown in FIG. 11, the field of view of the image capture device 33 moves. In other words, on the display screen S, the tool 20 moves in the direction of the path of the above-mentioned contact position. In this way, the contour line 51 of the tool 20 outside the field of view moves to inside the field of view of the image capture device 33. Based on the image data which is output along with movement, the contour line 51 of the tool 20 is specified in the same way as the above-mentioned second embodiment. After that, in the same way as the first embodiment, the tool size or cutting edge position of the tool 20 may be measured based on designation of a measurement point on the contour line 51.

In the above way, according to the machine tool 10 according to the third embodiment, if the operator who is measuring the dimensions follows a predetermined movement path on the touch panel 45 by his or her finger, the measurement portion of the tool 20 on the display screen S, that is, the contour line 51 of the tool 20 outside the field of view, can be specified. In this way, the operator can measure the shape of the tool 20 extremely simply. In addition, the operator can, for example, designate a specific position of the contour line 51 of a tool 20 whereby the tool size and cutting edge position of the tool 20 are automatically measured. Therefore, according to such a method of measurement of dimensions of a tool 20, it is possible, for example, for the measurement portion of an unenvisioned tool which has a complicated contour line such as a multistep tool to be simply specified.

Figure 12:
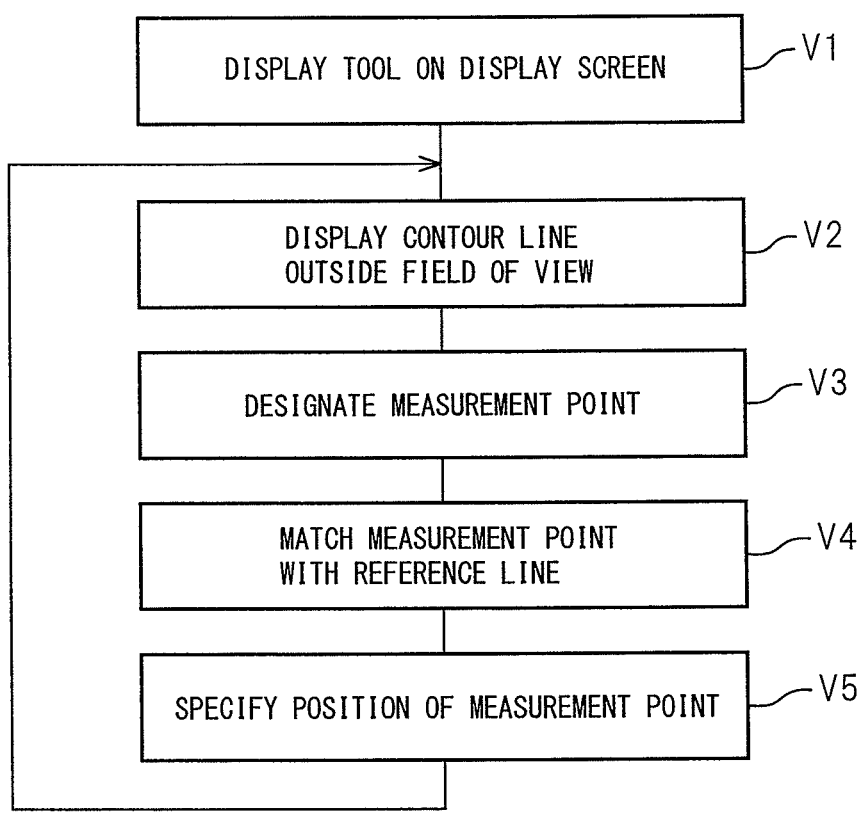
FIG. 12 is a flow chart which shows the flow of processing of a method of measurement of tool dimensions according to a fourth embodiment of the present invention.
Figure 13:
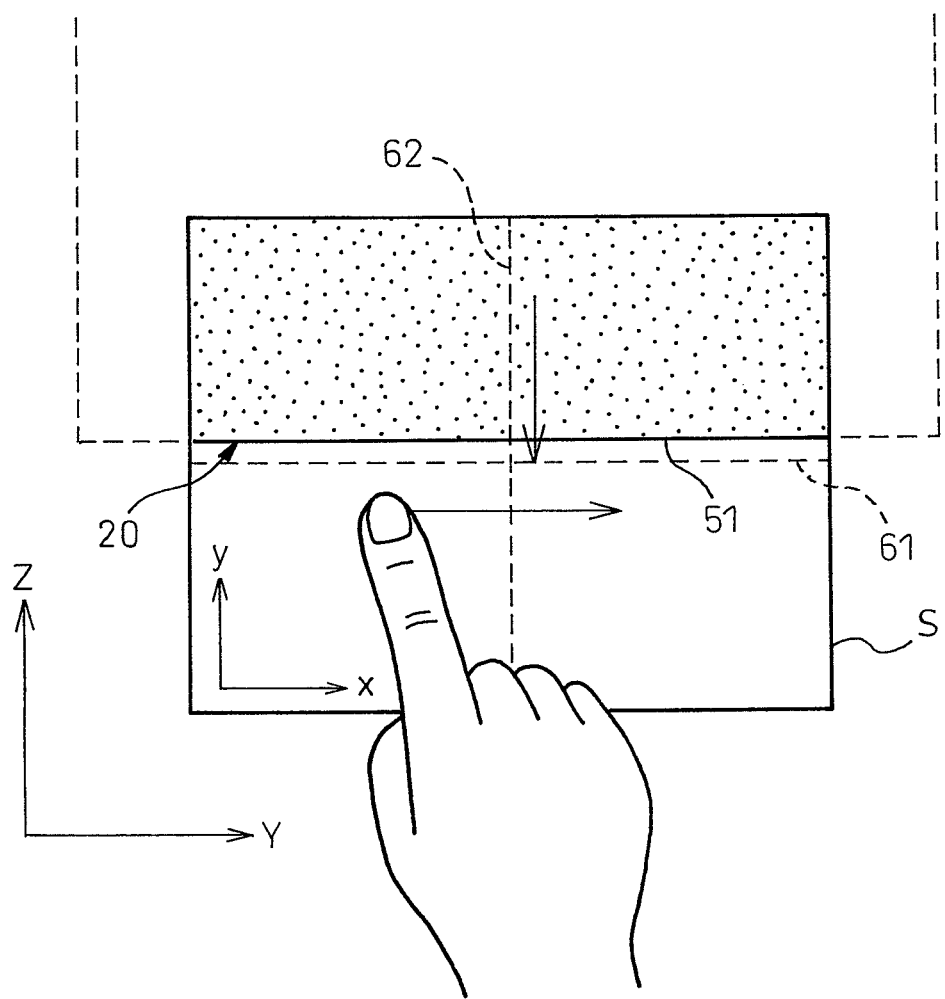
FIG. 13 is a view which shows a step of using an image which is displayed on a display screen as the basis to specify the shape of a tool.

Next, a method of measurement of dimensions of a tool 20 according to a fourth embodiment of the present invention will be explained. FIG. 12 is a flow chart which shows the flow of processing of the method of measurement of dimensions of a tool 20 according to a fourth embodiment of the present invention. In this fourth embodiment, the flick operation and drag operation are turned on. Here, for the tool 20, instead of the above-mentioned ball end mill, for example, a flat end mill may be used. In the same way as the above-mentioned first embodiment, the tool 20 descends toward the measurement position along the Z-axis. As shown in FIG. 13, the field of view of the image capture device 33, that is, the display screen S, is set at an intermediate position in the y-axial direction in the display screen S with a Z-axial direction position reference line 61 which is parallel with the x-axis. Similarly, the display screen S is provided at an intermediate position in the x-axial direction in the display screen S with a Y-axial direction position reference line 62 which is parallel to the y-axis.

Figure 14:
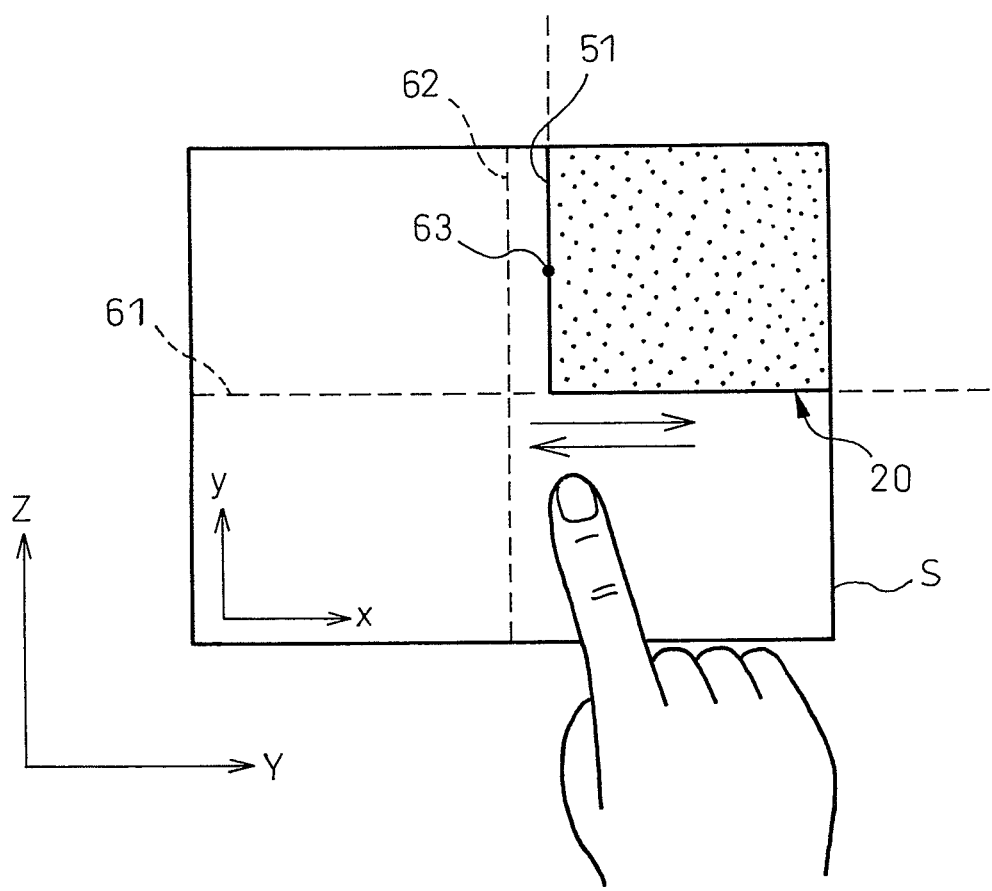
FIG. 14 is a view which shows a step of using an image which is displayed on a display screen as the basis to specify the shape of a tool.

The processing device 42 outputs a skip signal to the NC device 12 when the bottom end of the tool 20 matches the Z-axial direction position reference line 61. Based on the skip signal, the NC device 12 makes the movement of the tool 20 stop. In this way, at step V1, the display screen S displays the contour of the tool 20. In the same way as the third embodiment, since the dimensions of the tool 20 are larger than the field of view of the image, the contour of the tool 20 as a whole does not fit in the display screen S. At this time, if the operator, for example, uses a flick operation or drag operation to make the finger for example move to the right side on the touch panel 45, the processing device 42 calculates the path of the contact position. Based on the output of the movement signal which is generated based on the calculated path, the tool 20 is made to move in parallel to the Y-axis. In this way, as shown in FIG. 14, the display screen S displays the contour line 51 of the other side (left side) outside of the field of view of the tool 20 (step V2). The left side contour lines 51 is arranged at the right side from the Y-axial direction position reference line 62.

At this time, if the operator contacts any point on the left side contour line 41 of the tool 20, at step V3, the processing device 42 uses the coordinate values which are output from the touch panel 45 as the basis to designate this point as the measurement point 63. After that, the operator, for example, uses a flick operation to make the finger move over the left side contour line 51 in a direction away from the Y-axial direction position reference line 62. In this way, a so-called relief operation is taught. Based on the processing for calculation of the contact position of the processing device 42, the tool 20 is made to move in a direction away from the Y-axial direction position reference line 62 in parallel with the Y-axis. After that, the operator, for example, uses a flick operation to make the finger move in a direction making the left side contour line 51 approach the Y-axial direction position reference line 62. A so-called approach operation is taught. Based on the processing for calculation of the contact position of the processing device 42, the tool 20 is made to move in a direction approaching the Y-axial direction position reference line 62 in parallel with the Y-axis.

Figure 15:
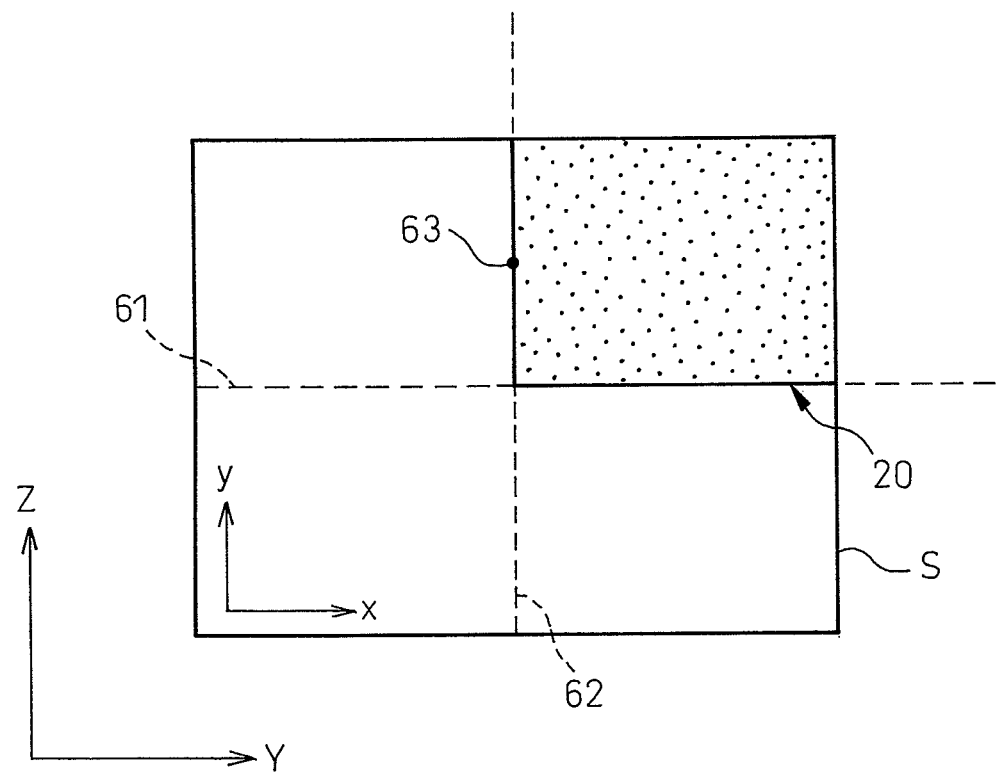
FIG. 15 is a view which shows a step of using an image which is displayed on a display screen as the basis to specify the shape of a tool.
Figure 16:
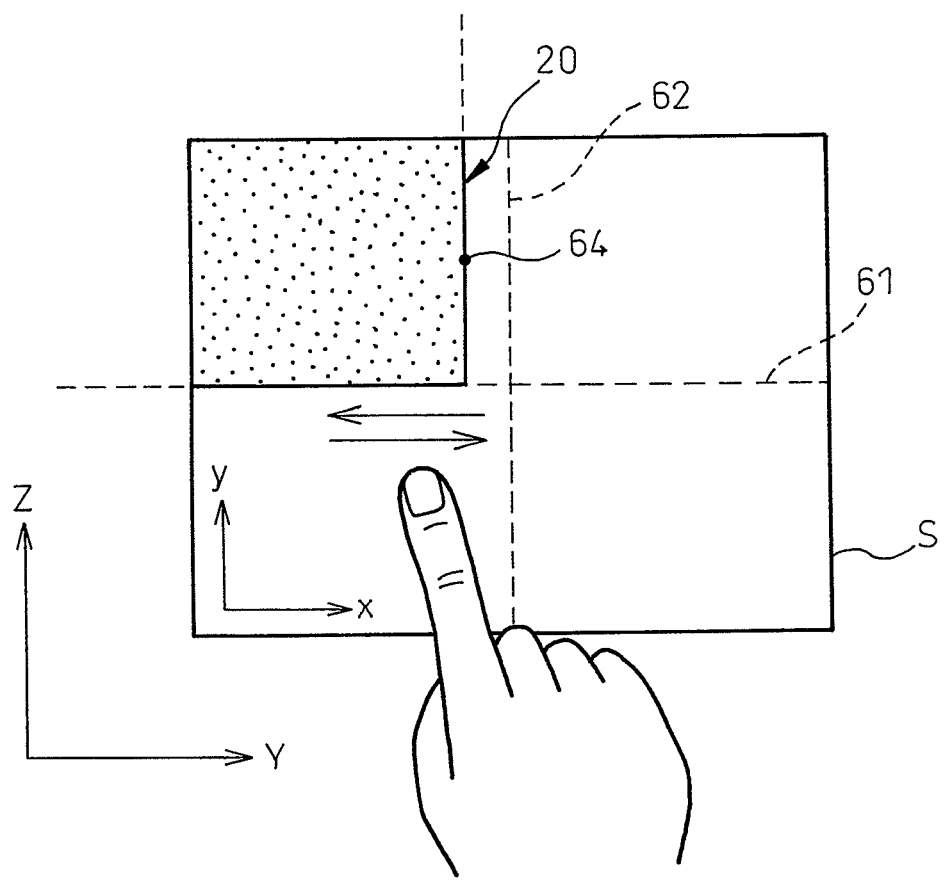
FIG. 16 is a view which shows a step of using an image which is displayed on a display screen as the basis to specify the shape of a tool.

As a result, as shown in FIG. 15, if the left side contour line 51 of the tool 20 matches the Y-axial direction position reference line 62, the processing device 42 outputs a skip signal to the NC device 12. Based on the skip signal, the NC device 12 makes the movement of the tool 20 stop. In this way, at step V4, the processing device 42 makes the measurement point 63 match the Y-axial direction position reference line 62. In this way, the tool 20 is positioned at the first position. At step V5, the processing device 42 specifies the Y-axis position coordinate value in the reference coordinate system of the tool 20 at the first position. After that, if a drag operation of the operator, for example, is used to make the finger move to the left side on the touch panel 45, based on calculation of the path of contact position by the processing device 42, the tool 20 is made to move in parallel with the Y-axis. As a result, as shown in FIG. 16, the display screen S displays the contour line 51 at the other side (right side) outside the field of view of the tool 20 (step V2). The right side contour line 51 is arranged at the left side from the Y-axial direction position reference line 62.

After that, steps V2 to V5 are repeated in a direction opposite to the above. Specifically, if the operator contacts any point on the right side contour line 51 of the tool 20, at step V3, the processing device 42 uses the coordinate values which are output from the touch panel 45 to output this point as the measurement point 64. After that, the operator teaches a relief operation. The processing for calculation of the contact position of the processing device 42 is used as the basis to make the tool 20 move in a direction away from the Y-axial direction position reference line 62 in parallel to the Y-axis. After that, the operator teaches an approach operation. Based on the processing for calculation of the contact position of the processing device 42, the tool 20 is made to move in a direction approaching the Y-axial direction position reference line 62 in parallel to the Y-axis (step V4). If the right side contour line 51 of the tool 20 matches the Y-axial direction position reference line 62, the movement of the tool 20 stops. In this way, the tool 20 is positioned at the second position which is different from the first position. The Y-axis position coordinate value at the reference coordinate system of the tool 20 at the second position is specified (step V5).

The processing device 42 can subtract, for example, from the coordinate values of the tool 20 at the first position the coordinate values of the tool 20 at the second position so as to specify the length of the tool 20 in the Y-axial direction, that is, the tool size. At the same time, an intermediate position which is prescribed between the coordinate values of the first position and the coordinate values of the second position can be used as the basis to specify the center axial line of the tool 20. The center axial line is prescribed in parallel to the Z-axis. At this time, as performed before the measurement processing, the tool 20 rises once along the Z-axis, then descends toward the measurement position along the Z-axis. At this time, on the display screen S, the center axial line of the tool 20 is positioned to match the Y-axial direction position reference line 62. In this way, if the bottom end of the tool 20 matches the Z-axial direction position reference line 61, the movement of the tool 20 is stopped. At this time, the center point at the bottom end of the tool 20 which passes through the center axial line is positioned at the intersection of the Z-axial direction position reference line 61 and Y-axial direction position reference line 62. In this way, this intersecting point is specified as the cutting edge position of the tool 20.

In the above way, according to the machine tool 10 according to the fourth embodiment, if the operator who is measuring the dimensions follows a predetermined movement path on the touch panel 45 by his or her finger, a measurement portion of the tool 20 on the display screen S, that is, a contour line 51 of the tool 20 outside the field of view, can be specified. The operator can measure the dimensions of the tool 20 extremely simply. In addition, the operator can, for example, designate a specific position of the contour line 51 of the tool 20 for automatic measurement of the tool size of cutting edge position of the tool 20. Therefore, according to the method of measurement of dimensions of the tool 20, it is possible, for example, for the measurement portion of an unenvisioned tool which has a complicated contour line such as a multistep tool to be simply specified.

In the above embodiments, the method of measurement and the apparatus for measurement of the tool dimensions of the present invention were explained using a vertical machining center as an example of the machine tool 10, but the method of measurement and the apparatus for measurement of tool dimensions of the present invention can also be realized by, for example, a horizontal machining center or other machine tool. Further, the method of measurement and the apparatus for measurement of tool dimensions of the present invention were explained using a ball end mill as an example of a tool 20, but the method of measurement and the apparatus for measurement of tool dimensions of the present invention can also be realized, for example, for another tool.

The invention claimed is:

1. A method of measurement of tool dimensions which uses an image capture device which moves relative to a tool, attached to a spindle of a machine tool, so as to capture an image of said tool, the obtained image data being used to measure the dimensions of said tool, the method of measurement of tool dimensions, comprising the steps of:
   displaying an image including a contour of said tool which was captured by said image capture device on a display screen of the display device,
   detecting a plurality of successive teaching points of different positions, designated by touching on said image, by a contact detection device,
   specifying a contour line of said tool, extending near said teaching points,
   indicating a measurement point on or near the specified contour line, and
   specifying a measurement portion of a shape of said tool, measurement direction, or movement direction of said tool based on the specified contour line and the measurement point.

2. The method of measurement of tool dimensions according to claim 1, wherein in the step of specifying said measurement portion, measurement direction, or movement direction, at least one of a movement path of said tool and a center axial line of said tool is calculated based on the specified contour line.

3. The method of measurement of tool dimensions according to claim 1, wherein in the step of specifying said measurement portion, measurement direction, or movement direction, a path through said teaching points is calculated based on the detected plurality of successive teaching points, and movement signals are output to move said image based on the calculated path so that a portion of the contour of said tool outside the field of view is moved into the field of view.

4. An apparatus for measurement of tool dimensions which uses image data which was obtained by capturing an image of the tool, attached to a spindle of a machine tool, so as to measure the dimensions of said tool,
   said apparatus for measurement of tool dimensions comprising:
   an image capture device which captures an image including a contour of said tool,
   a display device which has a display screen which displays said image, a contact detection device which detects a plurality of successive teaching points of different positions designated by touching on said image, and a processing device for specifying a contour line of said tool, extending near said detected teaching points and specifying a measurement portion of a shape of said tool, measurement direction, or movement direction of said tool based on the specified contour line and a measurement point indicated by touching said contact detection device on or near the specified contour line.

5. The apparatus for measurement of tool dimensions according to claim 4, wherein said processing device, when specifying said measurement portion, measurement direction, or movement direction, at least one of a movement path of said tool and a center axial line of said tool is calculated.

6. The apparatus for measurement of tool dimensions according to claim 4, wherein said processing device, when specifying said measurement portion, measurement direction, or movement direction, a path through said teaching points is calculated based on the detected plurality of successive teaching points and movement signals are output to move said image based on the calculated path so that a portion of the contour of said tool outside the field of view is moved into the field of view.

* * * * *